March 18, 1941. C. W. TYSON 2,235,127
PROCESS FOR REMOVING VOLATILE SOLVENTS FROM POLYMERIZED SUBSTANCES
Filed Sept. 21, 1938
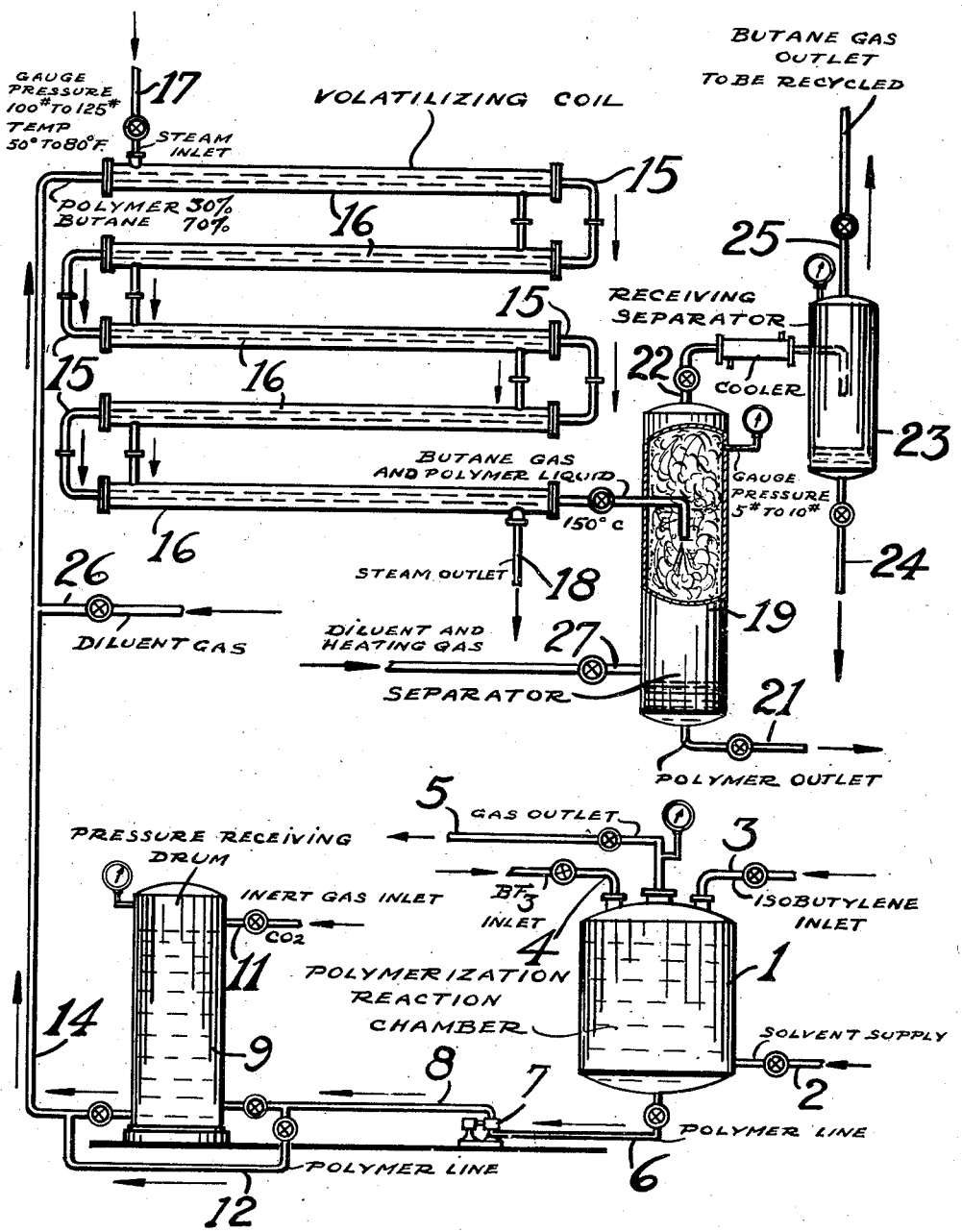
Charles W. Tyson Inventor
By P. L. Young Attorney Patented Mar. 18, 1941

2,235,127

UNITED STATES PATENT OFFICE 2,235,127

PROCESS FOR REMOVING VOLATILE SOLVENTS FROM POLYMERIZED SUBSTANCES

Charles W. Tyson, Summit, N. J., assignor to Standard Oil Development Company, a corporation of Delaware Application September 21, 1938, Serial No. 230,994

11 Claims. (Cl. 260—94)

This invention relates to processes for the manufacture and purification of polymerized iso-olefin substances, and relates particularly to methods for the purification of high molecular weight polymers formed by the polymerization in solution of olefin substances.

In the petroleum cracking industry, there are available valuable waste gases containing substantial percentages of unsaturated hydrocarbon compounds, and considerable proportions of the propylenes, butylenes and amylenes which are gaseous under ordinary conditions of temperature and pressure, and are readily separated from the higher molecular weight unsaturated compounds, and from hydrogen and ethylene. These gaseous olefins are readily polymerizable into high molecular weight polymer compounds by the use of such catalysts as boron tri-fluoride, aluminum chloride and similar materials at low temperatures ranging from −10° C. down to −100° C. The polymerization may be continued to the formation of polymerized bodies having molecular weights ranging from 1,000 to 200,000. A particularly advantageous procedure is found in the polymerization of iso-butylene in the presence of solvent and refrigerant liquids, such as ethane, ethylene, propane, butane and the like, or ethyl chloride, or similar refrigerants and solvents. These solvent refrigerants may be utilized also for dissolving the catalyst, to increase the catalytic effect, for the production of the desired polymerized resins of suitably high molecular weight. When, however, these solvent and diluent substances are used, particularly if the higher boiling solvents such as butane or ethyl chloride are used, difficulty is encountered in removing the solvents from the polymer. This removal is quite urgently necessary, since residual portions of the solvents, particularly the higher boiling solvents, interfere with the desired solidity and other characteristics of the polymer substance.

The present invention utilizes the steps of heating the solution of the polymerized resin to a substantially raised temperature (under pressure if desired) sufficient to provide as sensible heat a substantial portion of the latent heat of vaporization of the solvent, and thereafter discharging the heated polymer solution into a container at lower, or atmospheric pressure to cause immediate volatilization of the solvent, either with or without the presence of an auxiliary current of heated gas to carry off the volatilized solvent.

Thus the invention consists of a system including a reaction chamber to which there are connected the various supply pipe lines for the iso-butylene, the catalyst, the solvent-refrigerant and also a pipe line to a transfer pump, which delivers the polymer solution through a gas supply chamber and a steam jacketed heater coil to a separating chamber in which the polymer collects, substantially free from solvent, and from which the volatilized solvent is delivered to the condensing system, various impurities and low polymer removed, and the solvent condensed and returned to the reaction vessel. Accordingly, objects of the invention are to separate a volatile solvent from a polymer substance; to heat a polymer solution to a temperature substantially above the boiling point of the solvent and thereafter discharge it into a separatory chamber; and to dilute a polymer solution with other gas preparatory to further heating and separation of the solvent by volatilization.

Other objects and structure details of the invention, as well as the process of the invention, will be apparent from the following description when read in connection with the accompanying drawing in which:

The single figure is diagrammatic representation of apparatus, including a reaction chamber, a heater and a separatory chamber, for practicing the invention.

Referring to the figure, the reaction chamber 1 is supported in any convenient manner, and connected by appropriate pipe leads to source of supply for the various reacting substances. Thus, the pipe line 2 is connected to a supply of liquid solvent-refrigerant; the pipe line 3 is connected to a supply of iso-butylene; the pipe line 4 is connected to a supply of the catalyst, which may be boron trifluoride or may be aluminum chloride or other suitable catalyst, and the pipe line 5 is connected to a receiver for the volatilized diluent-refrigerant.

The solution of polymer in the solvent-refrigerant is withdrawn from the reaction chamber 1 through a pipe line 6 which is connected to a pump 7 which discharges the solution through a pipe 8 to a receiver drum 9. This drum serves both as a warming means, and as a repressuring means, to provide sufficient pressure to send the solution through the volatilizing coil. Connected to the drum 9 there is also a pipe line 11 through which a supply of inert gas, preferably heated, is delivered for the repressuring. A by-pass pipe line 12 is connected between the pipe 8 and the outlet pipe 14 around the drum 9 to by-pass the solution when the pump 7 provides sufficient pressure, and it is not desired to warm the solution in a first stage. These several pipe lines are controlled by valves as shown. The pipe line 14 is connected to a steam jacketed heating coil 15 mounted within the steam jacket 16 which is supplied with steam through the pipe line 17, from which the condensate is drained by a pipe line 18. The heater coil 15 is connected to a separatory drum 19, and a throttle valve may be provided therein if desired, although usually it is not necessary and is preferably dispensed with. The drum 19 may be equipped with Raushig rings if desired, but is preferably left empty for the discharge and separation of the polymer and solvent. The drum 19 is preferably also heated or steam jacketed to maintain the fluidity of the polymer. From the drum 19 a pipe line 21 is provided for removal of the fluid polymer, and a pipe line 22 from the top of drum 19 is provided for discharge of the volatilized solvent and volatile polymer such as the dimer and trimer.

Pipe 22 leads to a second separatory drum 23 in which the solvent is cooled sufficiently to condense any dimer and trimer which may be present in the solvent vapors. The dimer and trimer may be removed through a pipe line 24, and the volatilized solvent in the form of a gas is removed through a pipe 25. The pipe 25 leads to a condensing equipment which may include a compressor, or may include a strongly cooled condenser coil; or the pipe line 25 may be connected with the pipe 6, and the gaseous solvent from both may be condensed simultaneously into cold refrigerant-solvent for return through pipe 2 to the reaction chamber.

Auxiliary supplies of inert gas may be supplied to and mixed with the polymer solution, in the pipe 14, the gas being delivered through the pipe 26, and additional hot, inert gas may be supplied to the drum 19 through the pipe 27 for stripping the last quantities of solvent from the polymer in the drum 19.

In practicing the process of this invention, the iso-butylene is purified by appropriate processes preparatory to the polymerizing reaction. It is then passed to the reaction chamber 1 which desirably contains a solvent such as ethylene or propane or butane and is provided with means of refrigeration. The means for refrigeration may consist of a charge of low boiling solvent, as above described; or it may consist of an inert refrigerant liquid, mixed with a suitable solvent, (that is, propane and ethyl chloride when aluminum chloride is used as catalyst) or it may consist of solid carbon dioxide with a suitable solvent within the reaction chamber, or it may consist of solid carbon dioxide and alcohol in a jacket around the reaction chamber. Alternatively, various other refrigerating systems are available, such as ammonia refrigeration through a jacket around the reaction chamber, or ethylene, propane, butane, etc., through a jacket, or liquid carbon dioxide etc., as desired.

The reaction chamber 1 also contains a catalyst which may be gaseous, such as boron fluoride which dissolves in the solvent liquid in the reaction chamber along with the purified olefin gas; or the catalyst may be aluminum chloride dissolved in an appropriate solvent in the reaction vessel such as ethyl or methyl chloride. The polymerization reaction occurs to yield the desired substance.

The polymerization is desirably continued until the solvent in the reaction chamber 1 contains an amount of polymer ranging from 20% to 30%. When this concentration is reached, the solution of polymer may be in part or preferably in whole withdrawn from the reaction chamber and replaced with fresh solvent for a continuation of the reaction. The withdrawal is accomplished by the pump 7 which delivers the polymer solution either through the pipes 8, 12 and 14 directly to the heating coil 15, or through the pipe 8, the repressuring drum 9 and the pipe 14 to the heating coil 15.

The cold polymer solution is then passed through a heating coil 15 under pressure produced by the pump 7, with or without the inclusion of inert gas under similar pressure from the pipe 26. The temperature of the polymer solution is then brought up to a point well above room temperature and to a point such that the sensible heat of the solution aided by the inert gas, and by the reduction of vapor pressure resulting from the presence of the inert gas is sufficient to provide for the latent heat of vaporization of the solvent. The heated solution is then discharged into the receiver drum 19.

The heated coil 15 may conveniently take the form of 1 inch internal diameter tubing, having a length of approximately 100 feet. The steam jacket 16 may desirably contain steam at a pressure in the neighborhood of 50 to 100 pounds to the square inch. The polymer solution may be received in the inlet end of the heater coil at a concentration of 20% to 30% polymer, and at a temperature of $-50$ to $-80°$ F. Under these circumstances the solution is very viscous, and this high viscosity is maintained during the passage of the solution through the heater coil. Because of this viscosity a pressure from 100 to 125 pounds to the square inch may be required from the pump 7 to force the solution through the heater coil. The heated material is discharged from the outlet end of the heater coil 15 at a temperature of approximately 150° C. The hot material is received in the separatory chamber 19 which is held at a pressure very slightly above atmospheric pressure.

It is preferable that the receiver 19 also be heated externally to maintain the temperature of the de-solvanized polymer at a point favorable to maximum plasticity or fluidity, both for the purpose of aiding in the driving out of the last traces of solvent and for facilitating the collection of the polymer in a softened or semi-fluid condition.

Under such conditions of temperature and pressure the solvent, whether in the presence of inert gas, in addition to the polymer, or in the presence of the polymer alone, is substantially completely vaporized as it leaves the end of the heating coil 15. The non-volatile polymer is carried along with the current of volatilized solvent and is thrown on to the walls of the drum 19, or on to the Raushig rings if such are used. The volatilized solvent passes out from the drum 19 by way of the pipe 22, and the hot polymer collects in the bottom of the drum 19 from which it is removed through the pipe 21.

The fluid polymer in its downward passage in the drum 19 comes in contact with the hot inert gas passed in through the pipe 27, and is thereby efficiently stripped of the last traces of volatile material.

It is found that in the operation of the process there are produced not only the relatively high molecular weight non-volatile polymer which is the primary product, but there are also produced small amounts of other polymers such as the dimer and trimer which are undesirable in the heavy polymer and are also volatile. These dimer and trimer polymers are also volatilized and stripped from the heavy polymer and are carried along with the volatile solvent into the recovery drum 23. The gases are cooled in the drum 23 to approximately room temperature or a few degrees below, and the dimer and trimer are thereby condensed, separated from the gaseous solvent and withdrawn from the collector 23 through the pipe 24. These polymers are suitable for use as anti-knock agents in gasoline type fuels.

The gaseous solvent leaves the collector 23 by way of the pipe 25, and because of the relatively high vapor pressure of the dimer and trimer polymers, appreciable quantities of the polymers may be carried along. The gaseous solvent is then conveniently recycled to the reaction chamber 1, for which purpose it is compressed, usually by a two-stage compressor.

It is found that the dimer and trimer substances are active catalyst poisons, and they are therefore highly undesirable in the reaction chamber 1. Accordingly, both the solvent volatilized within the reaction chamber 1 and the volatile solvent from the collector 23 may be conveyed to the same compressor and compressed together since the effluent gas from the reaction chamber 1 also contains perceptible quantities of dimer and trimer of isobutylene. However, by the use of an inter-stage cooler between the successive stages of the compressor, the cooling at the intermediate pressure is sufficient to condense substantially all of the dimer and trimer polymers which may be removed and the effluent gas upon cooling after the second compressor stage is substantially pure solvent, which may be butane, ethylene, etc. free from dimer and trimer, according to the original solvent supplied to the reaction chamber 1.

It will be observed that this process is particularly advantageous in connection with the manufacture of a polymer material having a molecular weight within the range of 1,000 to 15,000, since while polymers within this range are very viscous, they are sufficiently fluid, especially at the elevated temperature within the drum 19, to flow therein and to flow out through the drain pipe 21. The procedure is suitable for use with higher molecular weight polymers up to the point where the temperature required to produce a sufficient fluidity to remove the material from the drum 19 is so high as to produce an undesired amount of depolymerization or cracking.

The above embodiment describes broadly a process in which the separation of the solvent from the polymer occurs at or above atmospheric pressure. In some instances it is desirable to conduct the operation at lower temperatures and pressures, and for this purpose the chamber 19 and the subsequent members of the system may be evacuated to pressures below atmospheric, thereby facilitating the separation of solvent from polymer and reducing the necessary temperatures.

Thus, the process of the invention provides a simple, convenient, method of removing the solvent from the heavy polymer, and for collecting the polymer, free from solvent.

While there is above described but a single embodiment of the invention, it is possible to provide still other embodiments without departure from the inventive concept herein disclosed and it is therefore desired that only such limitations be imposed upon the appended claims as are stated therein or required by the prior art.

The invention claimed is:

1. In the preparation of a hydrocarbon polymer the steps of polymerizing an olefin in a solvent, heating the polymer solution to a temperature substantially above the boiling point of the solvent, discharging the heated polymer solution into a receiver and separating the volatilized solvent from the non-volatile polymer.

2. In the preparation of a hydrocarbon polymer the steps of polymerizing an olefin in a solvent, heating the polymer solution to a temperature substantially above the boiling point of the solvent at atmospheric pressure, discharging the heated polymer solution into a receiver at atmospheric pressure and separating the volatilized solvent from the non-volatile polymer.

3. In the preparation of a hydrocarbon polymer the steps of polymerizing an olefin in a solvent, heating the polymer solution under pressure to a temperature substantially above the boiling point of the solvent, discharging the heated polymer solution into a receiver, separating the volatilized solvent from the non-volatile polymer, and collecting the solvent free polymer in substantial masses.

4. In the preparation of a hydrocarbon polymer the steps of polymerizing an olefin in a solvent, heating the polymer solution to a temperature substantially above the boiling point of the solvent at atmospheric pressure, discharging the heated polymer solution into atmospheric pressure and separating the volatilized solvent from the non-volatile polymer.

5. In the preparation of a hydrocarbon polymer the steps of polymerizing an olefin in a solvent, heating the polymer solution under pressure to a temperature substantially above the boiling point of the solvent at atmospheric pressure, discharging the heated polymer solution into atmospheric pressure, separating the volatilized solvent from the non-volatile polymer, recovering the volatilized solvent by condensation, and collecting the solvent free polymer in substantial masses.

6. The process of preparing a pure hydrocarbon polymer comprising in combination the steps of dissolving an olefin and a Friedel-Crafts type catalyst in a solvent at low temperature, to produce a polymer solution, forcing the polymer solution under high pressure through a heater coil, volatilizing the heated polymer solution at relatively low pressure, and separating the volatilized solvent from non-volatile polymer at an elevated temperature.

7. The process of preparing a pure hydrocarbon polymer comprising in combination the steps of dissolving isobutylene and a Friedel-Crafts type catalyst in a solvent at low temperature, to produce a polymer solution, forcing the polymer solution under high pressure through a heater coil, volatilizing the heated polymer solution at relatively low pressure, and separating the volatilized solvent from non-volatile polymer at an elevated temperature.

8. The process of preparing a pure hydrocarbon polymer comprising in combination the steps of dissolving isobutylene and a Friedel-Crafts type catalyst in a solvent at low temperature, to produce a polymer solution, forcing the polymer solution with heated inert gas under high pressure through a heater coil, volatilizing the heated polymer solution at relatively low pressure, and separating the volatilized solvent from non-volatile polymer at an elevated temperature.

9. The process of preparing a pure polymer comprising in combination the steps of dissolving isobutylene and a Friedel-Crafts type catalyst in a solvent at low temperature, to produce a polymer solution, forcing the polymer solution under high pressure through a heater coil, volatilizing the heated polymer solution at relatively low pressure, separating the volatilized solvent from non-volatile polymer at elevated temperature, and cooling the volatilized solvent.

10. The process of preparing a pure polymer comprising in combination the steps of dissolving isobutylene and a Friedel-Crafts type catalyst in a solvent at low temperature, to produce a polymer solution, forcing the polymer solution under high pressure through a heater coil, volatilizing the heated polymer solution at relatively low pressure, separating the volatilized solvent from non-volatile polymer at an elevated temperature, cooling and condensing the volatilized solvent and returning it to the reaction chamber for reuse.

11. In the preparation of a hydrocarbon polymer the steps of polymerizing an olefin in a solvent, heating the polymer solution under pressure to a temperature substantially above the boiling point of the solvent at atmospheric pressure, discharging the heated polymer solution into atmospheric pressure, separating the volatilized solvent from the non-volatile polymer, collecting the solvent free polymer in substantial masses, and cooling the volatilized solvent and separating therefrom volatilizable polymer.

CHARLES W. TYSON.

DISCLAIMER 2,235,127.—*Charles W. Tyson*, Summit, N. J. PROCESS FOR REMOVING VOLATILE SOLVENTS FROM POLYMERIZED SUBSTANCES. Patent dated March 18, 1941. Disclaimer filed May 16, 1944, by the assignee, *Jasco, Incorporated*.
Hereby disclaims claim 1 of said patent.
[*Official Gazette June 20, 1944.*]